(12) United States Patent
Dietrich

(10) Patent No.: US 7,380,344 B2
(45) Date of Patent: Jun. 3, 2008

(54) DEVICE FOR DETERMINING THE WHEEL AND/OR AXLE GEOMETRY OF MOTOR VEHICLES

(75) Inventor: Adolph Dietrich, Albershausen (DE)

(73) Assignee: Robert Bosch GmbH, Stuttgart (DE)

( * ) Notice: Subject to any disclaimer, the term of this patent is extended or adjusted under 35 U.S.C. 154(b) by 121 days.

(21) Appl. No.: 10/540,339

(22) PCT Filed: Jul. 25, 2003

(86) PCT No.: PCT/DE03/02517

§ 371 (c)(1),
(2), (4) Date: Feb. 21, 2006

(87) PCT Pub. No.: WO2004/061390

PCT Pub. Date: Jul. 22, 2004

(65) Prior Publication Data

US 2006/0156562 A1    Jul. 20, 2006

(30) Foreign Application Priority Data

Dec. 20, 2002  (DE) ................. 102 59 954

(51) Int. Cl.
    *G01B 11/275* (2006.01)
(52) U.S. Cl. .................... 33/288; 33/203.18
(58) Field of Classification Search ............. 33/203, 33/203.18, 203.19, 203.2, 288
    See application file for complete search history.

(56) References Cited

U.S. PATENT DOCUMENTS 5,341,575 A * 8/1994 Chisum ............... 33/288
5,421,095 A * 6/1995 Matteucci .............. 33/203
5,442,549 A * 8/1995 Larson ................ 33/288
5,724,128 A * 3/1998 January .............. 33/203.18

(Continued)

FOREIGN PATENT DOCUMENTS

DE    44 19 584    12/1995

(Continued)

*Primary Examiner*—G. Bradley Bennett
(74) *Attorney, Agent, or Firm*—Kenyon & Kenyon LLP

(57) ABSTRACT

The present invention relates to a device for determining the wheel geometry and/or the axle geometry of motor vehicles in an inspection room, using an optical measuring apparatus having at least one image-taking device which records a marking device including at least one body feature and one reference feature system, and having an evaluating device, the position of the reference features in the inspection room being known in the evaluating device, and the recording of the marking device taking place during travel of the motor vehicle. The image-taking device is connected to a wheel to be measured, at its wheel rim in pivot joint fashion, and follows the rotating motion of the wheel, the optical axis of the image-taking device always being aligned essentially perpendicular to the roadway plane and the axis of rotation of the pivot joint being aligned in all wheel positions essentially parallel to the roadway plane. The reference feature system is situated in the roadway plane in the field of view of the image-taking device, and the at least one body feature is always situated in the field of view of the image-taking device and follows the movement of the motor vehicle. The position of the axis of rotation and/or the plane of rotation of the wheel is able to be determined in the light of the position of a wheel feature that is to be ascertained.

13 Claims, 1 Drawing Sheet

U.S. PATENT DOCUMENTS

| | | | |
|---|---|---|---|
| 5,809,658 A * | 9/1998 | Jackson et al. | 33/288 |
| 6,526,665 B2 * | 3/2003 | Jackson | 33/203.18 |
| 2005/0126021 A1 * | 6/2005 | Robb et al. | 33/288 |
| 2006/0090356 A1 * | 5/2006 | Stieff | 33/288 |
| 2006/0274303 A1 * | 12/2006 | Jackson et al. | 33/203.18 |

FOREIGN PATENT DOCUMENTS

| | | |
|---|---|---|
| DE | 197 57 760 | 7/1999 |
| DE | 199 34 864 | 2/2001 |
| EP | 0 880 009 | 11/1998 |
| EP | 0 943 890 | 9/1999 |
| WO | 00 70304 | 11/2000 |
| WO | 01 11313 | 2/2001 |

* cited by examiner

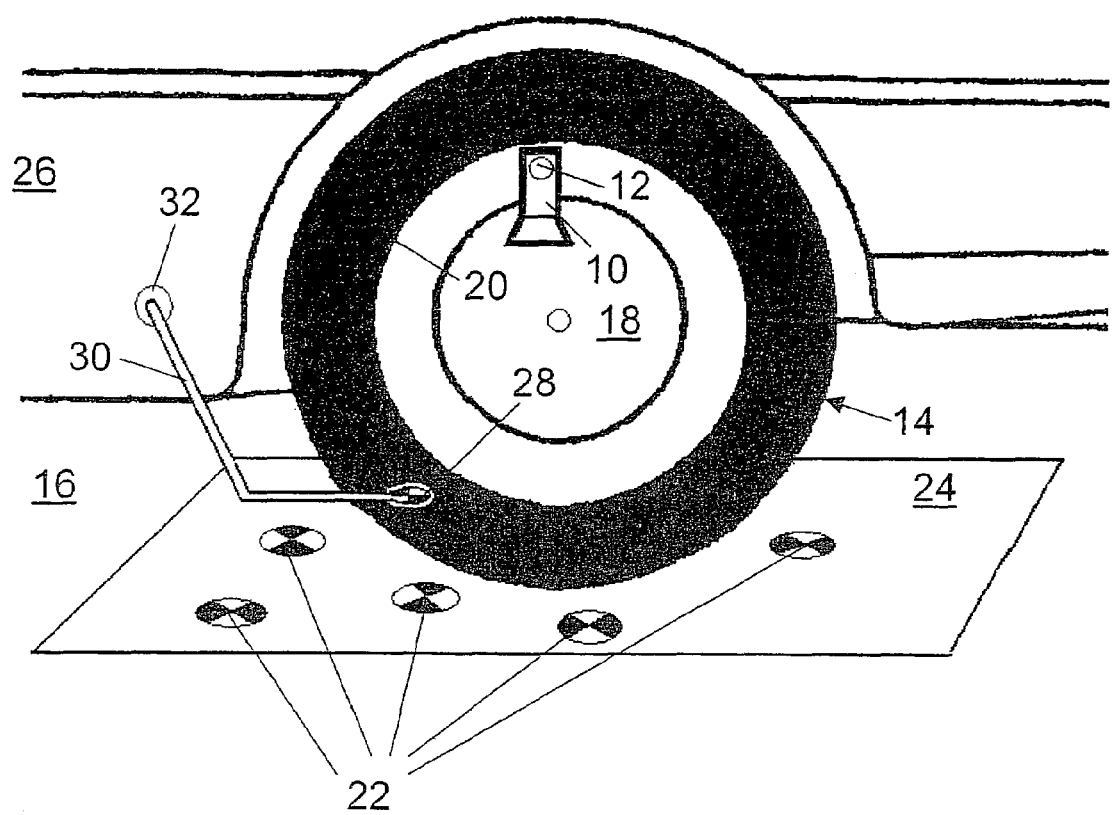

DEVICE FOR DETERMINING THE WHEEL AND/OR AXLE GEOMETRY OF MOTOR VEHICLES

FIELD OF THE INVENTION

The present invention relates to a device for determining the wheel geometry and/or the axle geometry of motor vehicles in an inspection room, using an optical measuring apparatus having at least one image-taking device which records a marking device including at least one body feature and one reference feature device, and having an evaluating device, the position of the reference features in the inspection room being known in the evaluating device, and the recording of the marking device taking place during travel of the motor vehicle.

BACKGROUND INFORMATION

Such a device is known from German Published Patent Application No. 197 57 760, and it requires two image-taking devices to record the marking devices from two different perspectives. For this purpose, the two image-taking devices are situated laterally at a distance from the passing motor vehicle. An additional marking device is set up between the image-taking devices and the motor vehicle, which is utilized for the evaluation as reference feature device to determine a wheel plane. From the relative position of the wheel plane to the vehicle's motion coordinates it is then possible to determine at least the wheel plane and/or the axle geometry.

German Published Patent Application No. 199 34 864 also shows a device for determining the wheel geometry and/or the axle geometry of motor vehicles, and it also has an apparatus of two image-taking devices. In this instance, additional reference features are situated in one plane, and they are used to ascertain the vertical direction in the inspection room. The position of the wheel's axis of rotation is determined with respect to the vertical and the direction of the axis of travel, which is obtained from the path of motion of the body feature.

Such apparati always require two image-taking devices per wheel, which have to be set in a costly manner to a common measuring space. In addition, there is a great space requirement laterally from the motor vehicle, because of the required distance from the features that are to be recorded.

It is the object of the present invention to improve an apparatus for determining the wheel geometry and/or the axle geometry of motor vehicles of the above-named type in such a way that, in response to a simple measuring construction there comes about a reduction in the entire space requirement for the measuring equipment. Furthermore, complete measurement of the wheel geometry and/or the axle geometry is to be made possible.

SUMMARY OF THE INVENTION

According to the present invention, the object is attained by connecting the image-taking device, in a pivot jointed manner, to a wheel to be measured, at its wheel's rim, and having it follow the rotating motion of the wheel, the optical axis of the image-taking device always being aligned essentially perpendicular to the roadway plane and the axis of rotation of the swivel joint being aligned in all wheel positions essentially parallel to the roadway plane. In this context, only one image-taking device is required per wheel to be measured.

In a particularly simple manner, the reference feature device is situated essentially in the roadway plane in the field of view of the image-taking device, so that additional positioning of the reference features, perhaps perpendicular to the roadway plane, does not apply. In this context, the at least one body feature is always situated in the field of view of the image-taking device, and follows the movement of the motor vehicle. The body feature informs the evaluating device of the position of the travel axis of the motor vehicle relative to the marking device. Consequently, one may determine in a simple manner the position of the axis of rotation and/or the plane of rotation of the wheel, with the air of the position of a wheel feature that is to be ascertained.

Using the apparatus according to the present invention, the space requirement for a measurement may be reduced to a narrow region next to the wheel to be investigated, at a length corresponding to the travel past, that is approximately ½ wheel circumference. A full measurement is possible. Consequently, the apparatus may be installed at any measuring location that is sufficiently level for measuring the axis, particularly since all the components are easy to transport. It is also possible to install it in connection with auto lifts.

After ascertaining the rim runout, the angles looked for, such as wheel toe and wheel camber are recorded by the camera as a first order change of magnitude. For this, no wide-angle objective is required to cover the roadway.

Consequently, if the wheel toe is known, the image-taking device may be used directly to measure angles during installation work. The great accuracy required for measuring spatial points is then no longer necessary.

According to one inventive idea, the wheel feature may be identified by a point on the wheel which is determined with the aid of the focal length and the corrected distortion of the objective, or similar optical property of the image-taking device, the positions of at least three of the reference features of the reference feature device and the relative position of the image-taking device, with respect to the axis of rotation of the swivel joint. Additional features for identifying the wheel point are not necessary.

Thus, the plane of rotation of the wheel may be ascertained in a simple manner by recording the path of rotation of the wheel feature, the translational movement of the motor vehicle, which is ascertained by the path of motion of the at least one body feature, being eliminated.

In order to ensure an especially simple handling of the reference feature device, the reference feature device may have a carrier unit, whose positioning in the inspection room is able to be executed in any desired manner, and on which the reference features are provided in the form of reference structures or specially mounted reference features. Thus, the reference feature device may be laid onto the roadway surface, so that the motor vehicle travels past the reference feature device or over it.

According to one especially advantageous embodiment, the reference feature device and/or the at least one body feature is designed as an optically recordable mark, the image-taking device for recording it being designed as a camera. If the optically recordable marks are formed as light-emitting diodes, lamps, light exit openings of optical fibers or similar light sources, this particularly ensures reliable detection by the optical measuring device.

In this context, at least a part of the light sources may light up synchronously with the camera shutter of the image-taking device. This makes possible a better distinction of individual features at different times.

What can also contribute to this, is if the reference feature device and/or the at least one body feature carries a code that is able to be recorded by the image-taking device. This code may be formed by showing patterns that light up in temporal sequence. It is also possible, as an additional feature for distinction, that the coding may be formed by the lighting up of differently colored light sources in a temporal sequence. To do this, it is provided that the image-taking device is designed as a color camera.

According to an additional preferred specific embodiment, the body feature may be omitted. For this purpose, an additional image-taking device, that is able to be operated independently of the image-taking device is positioned, which records the reference feature device that may be situated either essentially in the roadway plane or parallel to the roadway plane, above the motor vehicle.

BRIEF DESCRIPTION OF THE DRAWING

The FIGURE shows an embodiment of the present invention.

DETAILED DESCRIPTION

The FIGURE shows a digital CCD camera 10, which is fastened on a pivot pin 12 on wheel 14 in such a way that, following gravity, it looks essentially vertically downwards in the direction onto the level roadway surface 16.

In this context, deviations of the pin's position with respect to the horizontal may take on values up to ±10°. The same applies to the position of the camera with respect to the ideal alignment defined by the vertical at the test location.

Pivot pin 12 is detachably fastened at wheel rim 18 of wheel 14 in such a way that its position is not allowed to change during the measuring procedure, and in spite of that, a free swinging out of the camera is assured. Pivot pin 12 is mounted onto wheel rim 18 using a screw connection or a clamping connection. However, other detachable fastening possibilities are also possible.

In order to be able to determine as well as possible the position of camera 10 and pivot pin 12 relative to the axis of rotation, that is to be determined, of wheel 14, pivot pin 12 is fastened approximately at the height of rim edge 20 of wheel rim 18. This fastening position always makes possible a view of camera 10 onto the ground that is not concealed by wheel 14.

The optical axis of camera 10 and pivot pin 12 form approximately a right angle which, however, does not have to be exactly kept to, construction-wise. However, this angle has to be exactly ascertained once, which may take place during its production. In this context, it is advantageous if the angle between the optical axis of camera 10 and pivot pin 12 is greater than 90°, so that the field of view of the camera is on the ground outside next to the wheel.

On the ground, the camera sees a pattern made up of reference features 22, known to the evaluating device (not shown) that is connected using a cable connection, which form a reference feature arrangement 24 that defines a reference system. The position of reference features 22 is known to the evaluating device because of a preceding calibration. Reference feature system 24 has a carrier unit made, for instance, of a plastic material, whose positioning in the inspection room may be as desired. It is important, however, that reference feature system 24, during the measurement, be laid onto roadway surface 16 in an unshiftable manner, and is in itself torsionally rigid.

Reference feature system 24 may be developed as a planar system made up of a plurality of light-emitting diodes (LEDs) as reference features 22. These are able to light up synchronously with the camera shutter. Light exit openings of suitably laid optical fibers, into which light is coupled, may also be used in reference feature system 24 or also in body feature 28.

The size of reference feature system 24, in its width, i.e. perpendicular to the travel direction of the vehicle, goes according to the field of view of the camera, which, in turn, is determined by the focal length of the camera objective, and according to the maximally possible distance of camera 10 from roadway surface 16. One should take care that reference feature system 24 covers the area on roadway surface 16 which may be seen by camera 10 in response to wheel angles of wheel 14. In this context, the length of reference feature system 24 should be dimensioned in such a way that the wheel may execute about ½ wheel revolutions while going straight ahead next to reference features 22. In this context, a greater length and/or feature density aids the increase in measuring accuracy.

The LEDs or reference marks 22 on the preferably planar surface are marked in such a way that they may be clearly allocated by the evaluating device. In this context, reference features 22 may be offset with respect to one another in the plane of reference feature system 24. If LEDs are used, for example, at certain times certain patterns may light up as an image. This makes a detection possible, for instance, by the temporal sequence of the patterns. Coding via colored LEDs is also conceivable, provided camera 10 is designed as a color camera.

Camera 10 always sees only a part of reference features 22, namely those which just happen to lie in the field of view of camera 10. Since reference feature system 24 is clearly larger than the field of view of camera 10, the exact position of camera 10 may be recorded in a larger space than only via the field of view.

In addition to camera 10 on pivot pin 12 and to reference feature system 24 lying on roadway surface 16, at least one additional mark or LED is provided, which is connected to vehicle body 26, and is designated as body feature 28. Body feature 28 is detachably fastened to vehicle body 26 by a rod connection 30 using a suction cap 32 or using magnetic force.

As soon as the motor vehicle is moved along reference feature system 24, body feature 28 is moved closely over reference feature system 24, and is seen there by camera 10. It is the task of body feature 28 to make known to the evaluating device the position of the travel axis of the motor vehicle relative to reference feature system 24.

Knowing the position of the axis of travel permits one to ascertain the toe angle of wheel 14 that is being investigated. A further reference for the camber angle is established from the known position of the vertical with respect to reference feature device 24.

Camera 10 takes a series of images in temporal sequence. With the aid of the known camera properties, which include, for instance, the focal length and the corrected distortion of the objective, and the positions, likewise known, of at least three reference features 22 or LEDs in reference feature system 24, from each image, the position of a certain point on the axis of view of camera 10 as well as the position of the axis of view with respect to reference feature system 24 are able to be clearly calculated.

Using the known angle between camera 10 and pivot pin 12, one may calculate from this a point on the wheel (not shown), the so-called wheel point. This point is independent of the position of the wheel in the current rotational phase. The wheel point is also defined with respect to reference feature system 24.

During the traveling past of wheel 14, one obtains, with respect to reference feature system 24, a cycloid as the track of the wheel point. At the same time, the linear track of body feature 28 is also recorded. If one subtracts the vector of this linear motion from the cycloid in each image, the cycloid becomes a circle that is more or less closed, depending on the travel path.

For the evaluation, it is enough for the plane, on which these circle points lie, to be able to be determined with sufficient accuracy for the wheel-alignment measurement. Knowing the position of the rotational plane of the wheel point with respect to reference feature system 24, one may now calculate backwards to find the position of camera 10 in the current test arrangement at pivot point 12. This procedure is equivalent to ascertaining the rim runout of the usual wheel-alignment systems.

Consequently, after the close of the traveling past, camera 10 is directly able to record angle changes caused by repairs or wheel angles. The latter then makes possible, in a known manner, the ascertainment of the position of the pivot spindle in the vehicle system (specified by the axis of travel and the vertical), which is known by the concept of "complete measurement".

According to an additional (not shown) specific embodiment of the present invention, body feature 28 may be omitted. Instead, at the motor vehicle there is positioned an additional image-taking device that is operable independently of image-taking device 10, which records reference feature system 24. Using the latter, during the traveling past of wheel 14, the position of the axis of travel with respect to reference feature system 24 may be ascertained.

Alternatively, reference feature system 24 may be situated in the field of view of image-taking device 10, and, if provided, of the additional image-taking device, in an especially advantageous manner, parallel to the roadway plane and above the motor vehicle, for instance, at the ceiling of the workshop. In this case, image-taking device 10 and possibly also the additional image-taking device are mounted in such a way that they are essentially directed vertically upwards.

What is claimed is:

1. A device for determining at least one of a wheel geometry and an axle geometry of a motor vehicle in an inspection room, comprising:
    an optical measuring apparatus having at least one image-taking device for recording a marking device including at least one body feature and one reference feature system;
    an evaluating device, positions of reference features in the inspection room being known in the evaluating device, and the recording of the marking device taking place during travel of the motor vehicle, wherein:
    the image-taking device is connected via a swivel joint to a wheel rim of a wheel that is to be measured,
    the image-taking device follows a rotational motion of the wheel,
    an optical axis of the image-taking device is always aligned substantially perpendicular to a roadway plane,
    an axis of rotation of the swivel joint is aligned in all wheel positions substantially parallel to the roadway plane,
    the reference feature system is situated substantially in the roadway plane in a field of view of the image-taking device,
    the at least one body feature is always situated in the field of view and follows a movement of the motor vehicle, and
    a position of at least one of an axis of rotation of the wheel and a plane of rotation of the wheel is able to be determined on the basis of the position of a wheel feature to be ascertained.

2. The device as recited in claim 1, wherein:
the wheel feature is identified by a point on the wheel that is determinable in accordance with a focal length and a corrected distortion of an objective of the image-taking device, the positions of at least three of the reference features of the reference feature system, and a relative position of the image-taking device with respect to the axis of rotation of the swivel joint.

3. The device as recited in claim 1, wherein:
a determination of the plane of rotation of the wheel is made by recording a path of rotation of the wheel, and
a translational movement of the motor vehicle, which is ascertained by a path of motion of the at least one body feature, is eliminated.

4. The device as recited in claim 1, wherein:
the reference feature system includes a carrier unit whose positioning in the inspection room may be freely configured, and on which are provided the reference features in the form of one of reference structures and specially mounted reference features.

5. The device as recited in claim 1, wherein:
at least one of the reference feature system and the at least one body feature are developed as optically recordable marks, and
the image-taking device includes a camera.

6. The device as recited in claim 5, wherein: the optically recordable marks are formed by light sources including one of light-emitting diodes, lamps, and light exit openings of optical fibers.

7. The device as recited in claim 6, wherein at least a part of the light sources lights up synchronously with a camera shutter of the image-taking device.

8. The device as recited in claim 1, wherein at least one of the reference feature system and the at least one body feature bears a coding that is recordable by the image-taking device.

9. The device as recited in claim 8, wherein the coding is formed by showing patterns that light up in temporal sequence.

10. The device as recited in claim 8, wherein:
the coding is formed by lighting up differently colored ones of the light sources in temporal sequence, and
the image-taking device is a color camera.

11. A device for determining at least one of a wheel geometry and an axle geometry of a motor vehicle in an inspection room, comprising:
    an optical measuring apparatus including at least one first image-taking device for recording a marking device including one reference feature system;
    an evaluating device, a position of reference features in the inspection room being known in the evaluating device, and a recording of the marking device taking place during travel of the motor vehicle, wherein:
    the at least one first image-taking device is connected via a swivel joint to a wheel rim of a wheel that is to be measured, and follows a rotational motion of the wheel, an optical axis of the at least one first image-taking device is always aligned substantially perpendicular to a roadway plane, an axis of rotation of the swivel joint is aligned in all wheel positions substantially parallel to the roadway plane, at the motor vehicle there is positioned an additional image-taking device that is operable independently of the at least one first image-taking device and that records the reference feature system, and a position of at least one of the axis of rotation of the wheel and the plane of rotation of the wheel is able to be determined on the basis of a position of a wheel feature that is to be ascertained.

12. The device as recited in claim 11, wherein the reference feature system is situated substantially in the roadway plane, in a field of view of the at least one first image-taking device and of the additional image-taking device.

13. The device as recited in claim 11, wherein the reference feature system is situated parallel to the roadway plane and above the motor vehicle in a field of view of the at least one first image-taking device and of the additional image-taking device.

* * * * *